United States Patent [19]

Frump

[11] 4,082,892

[45] Apr. 4, 1978

[54] TEMPERATURE SENSITIVE GLASS ASSEMBLY HAVING AN AQUEOUS INTERLAYER OF AN OXAZOLINE SOLUTION

[75] Inventor: John Adams Frump, Terre Haute, Ind.

[73] Assignee: IMC Chemical Group, Inc., Terre Haute, Ind.

[21] Appl. No.: 731,079

[22] Filed: Oct. 12, 1976

[51] Int. Cl.$^2$ .............................................. B32B 17/06
[52] U.S. Cl. .................... 428/332; 428/426; 428/913; 428/38; 52/1; 52/171
[58] Field of Search .................. 428/913, 426, 332, 29, 428/34, 38; 252/1, 171, 172

[56] References Cited

U.S. PATENT DOCUMENTS

| | | | |
|---|---|---|---|
| 2,439,553 | 4/1948 | Winn | 52/171 X |
| 2,474,712 | 6/1949 | Aparicio | 52/171 X |
| 3,336,145 | 8/1967 | Purcell | 106/176 |
| 3,473,945 | 10/1969 | Futaki | 428/913 X |
| 3,843,632 | 10/1974 | Matsuo | 428/913 X |
| 3,893,938 | 7/1975 | Rauhut | 428/913 X |

Primary Examiner—P. C. Ives
Attorney, Agent, or Firm—Roger A. Williams; Robert H. Dewey; Howard E. Post

[57] ABSTRACT

A temperature responsive combination for transmitting or reflecting light comprising a double paned glass assembly and lying between said panes a temperature sensitive aqueous solution of a compound or mixture of compounds having the general formula

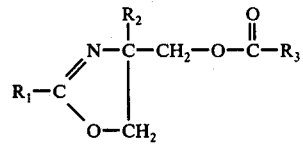

wherein $R_1$ is a lower alkyl of from 1 to 3 carbon atoms, $R_2$ is selected from the group consisting of hydrogen, methyl, ethyl and hydroxymethyl, and $R_3$ is selected from the group consisting of methyl, ethyl, propyl and methylethenyl.

10 Claims, No Drawings

TEMPERATURE SENSITIVE GLASS ASSEMBLY HAVING AN AQUEOUS INTERLAYER OF AN OXAZOLINE SOLUTION

BACKGROUND OF THE INVENTION

This invention relates to a temperature sensitive glass assembly.

In a particular aspect this invention relates to a temperature sensitive glass assembly, which is transparent below a given temperature and opaque at temperatures above that temperature.

The construction trade uses glass in the construction of buildings to allow use of natural lighting. The use of glass has its advantages and disadvantages. The use of transparent glass allows the greatest transmission of light. The transmitted light may be used to augment the heating system of a building in the winter months. In the summer months the transmitted light provides unneeded energy and becomes a burden on air-conditioning systems requiring additional items to reduce the amount of light transmitted, e.g., drapes, awnings, blinds, etc. Another type of glass used in construction is reflective glass which generally reflects up to 80% of the light striking it. In the summer months reflective glass reflects light waves that would add to the heat within a building. In the winter months the reflective glass continues to reflect light energy that could be used to provide additional heating. A disadvantage of both transparent and reflective glass is the transfer of heat energy by conduction. Insulated glass units solve the problem of transfer of heat by conduction, but do not solve the problem of efficient use of light energy inherent in transparent and reflective glass.

SUMMARY

It is an object of the present invention to provide a temperature sensitive glass assembly.

It is another object of the invention to provide a glass assembly that is transparent below a given temperature and opaque at temperatures above that temperature.

Other objects will be apparent to those skilled in the art from the disclosure herein.

There has been found a temperature responsive combination for reflecting or transmitting light comprising a double paned glass assembly and lying between said panes a temperature sensitive aqueous solution of an oxazoline or mixture of oxazolines having the general formula

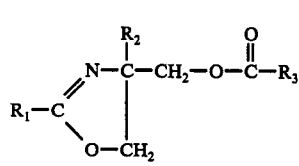

wherein $R_1$ is a lower alkyl of from 1 to 3 carbon atoms, $R_2$ is selected from the group consisting of hydrogen, methyl, ethyl and hydroxymethyl and $R_3$ is selected from the group consisting of methyl, ethyl, propyl and methylethenyl.

DETAILED DISCUSSION

The double paned glass assembly contemplated by this invention is constructed from two panes of glass positioned with their surfaces parallel to each other and sealed at their edges. The glass panes are positioned in such a manner that a space is formed between their surfaces. The glass panes that are used in the assembly can be sheets of glass of from about 1/10 inch to about ⅜ inch in thickness. Preferably, the glass used is from about ⅛ inch to ¼ inch in thickness. Generally, the glass panes are positioned in a manner such that their surfaces are from about ¼ inch to about 1 inch apart. Preferably, the distance is from about ¼ inch to ½ inch. The seal at the edges of the glass panes is airtight and impervious to the passage of air or water.

In the invention described herein the space between the panes of glass is filled with an aqueous solution of an oxazoline or mixture of oxazolines of the above general formula. The oxazolines generally are present in the aqueous solution from about 10% to about 50% by weight.

Compounds of the above general formula are oxazoline esters. These particular oxazoline esters are inversely soluble in water. That is, the solubility of these oxazoline esters decreases as the temperature of the water increases. At low temperatures the solution is clear and transmits light. At a certain temperature, depending on the oxazoline ester used, the solution becomes turbid, slightly cloudy. As the temperature of the solution is still further increased, the solution becomes cloudy. The solution turns opalescent, milky white, and absorbs or reflects light. The cloudy condition persists over a wide temperature range. If the compounds would separate from the water at a given temperature without forming a cloudy state, they would yield little practicality for they would be clear at elevated temperatures when reflectivity is needed the most.

It is a preferred embodiment of the invention to use an aqueous solution of from about 30% to about 40% by weight of 2-ethyl-4-methyl-4-propionyloxymethyl-2-oxazoline. Preferably a solution of about 37.5% by weight is placed between the panes of glass. The solution is clear and light is transmitted through the glass assembly up and to 22° C. At 23° C the solution becomes turbid and less light is transmitted. At 24° C the solution turns cloudy and reflects light. The cloudy condition persists over the temperature range of 24°-55° C, thereafter separation of the oxazoline ester and water begins to occur.

The solubility of the oxazoline ester compounds contemplated by this invention in water is dependent upon concentration and temperature. One skilled in the art can foresee the possibilities of varying the temperature at which cloudiness appears by varying the concentration of compound in solution.

The oxazoline esters useful in this invention are prepared from the esterification reaction of 4-hydroxymethyl oxazoline and a carboxylic acid. The 4-hydroxymethyl oxazoline is prepared by methods well known within the art such as the method of Purcell, U.S. Pat. No. 3,336,145, which is incorporated herein by reference. The oxazoline compounds can be readily prepared from carboxylic acids and alkanolamines corresponding to the formula

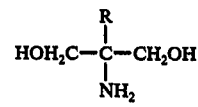

wherein R can be selected from the group consisting of hydrogen, methyl, ethyl and hydroxymethyl. The preparation of the oxazoline esters from the reaction of the oxazoline and another carboxylic acid is also known in the art as shown by Purcell, U.S. Pat. No. 3,336,145.

EXAMPLE 1

To a two-liter resin flask equipped with an agitator, thermometers for liquid and vapor, decanter head on an 8-inch Vigreaux and a condenser head was charged 735 g (7 g moles) of 2-amino-2-methyl-1,3-propanediol and 1036 g (14 g moles) of propionic acid. The mixture was heated with an electric mantle and toluene was added as needed to remove water. The mixture was heated until the water of reaction had been removed (approximately 7 ½ hours).

The mixture was distilled through a 24-inch stainless steel packed column at a pressure of 3 mm of Hg. The fractions distilling between 117° C and 156° C were collected for fractionation.

These fractions were purified by distilling through a 48-inch column packed with glass helices at a pressure of 1 mm of Hg. The fraction distilling between 140° C and 155° C was collected as the purified product 2-ethyl-4-methyl-4-propionyloxymethyl-2-oxazoline, 665.7 g, shown to be the compound by infrared and gas chromatographic analysis and to be 99.0% pure, with a neutralization equivalent of 198.6 (theoretical 199).

A solution was prepared by mixing 30.2 g of the 2-ethyl-4-methyl-4-propionyloxymethyl-2-oxazoline in 50 g of water. The compound exhibited inverse solubility in water as the temperature increased. Up and to 22° C (71.6° F) the compound was soluble in the water. At 23° C (73.4° F) the mixture became turbid, slightly cloudy. As the temperature reached 24° C (75.2° F), the mixture became cloudy and remained cloudy until 55° C (131.0° F) at which time the compound began to separate from the water.

The above mixture of 2-ethyl-4-methyl-4-propionyloxymethyl-2-oxazoline and water is placed between two ½ inch panes of glass spaced ½ inch apart and sealed at their edges. Up and to 22° C light is transmitted through the glass assembly. At a temperature of 23° C the mixture becomes turbid and less light is transmitted through. When the temperature reaches 24° C, the mixture is cloudy to the extent that the glass assembly becomes opalescent.

EXAMPLE 2

The procedure of Example 1 was repeated in all essential details with the exception that 2-amino-2-ethyl-1,3-propanediol was substituted for 2-amino-2-methyl-1,3-propanediol. The compound formed was 2,4-diethyl-4-propionyloxymethyl-2-oxazoline.

A mixture was prepared by combining 8.8 g of 2,4-diethyl-4-propionyloxymethyl-2-oxazoline with 70.1 g of water. The compound exhibited inverse solubility in the water. The compound was soluble at 3° C (37.4° F) and cloudy up to 55° C (131.0° F).

A glass assembly is prepared as in Example 1, with the exception that the mixture of 2,4-diethyl-4-propionyloxymethyl-2-oxazoline and water is placed between the two panes of glass. A glass assembly is produced that will transmit or reflect light.

EXAMPLE 3

2,4-Diethyl-4-methacryloyloxymethyl-2-oxazoline is prepared from 2-amino-2-ethyl-1,3-propanediol, propionic acid and methacrylic acid.

To a 500 ml round bottomed flask equipped with an agitator, two thermometers for liquid and vapor, and a dropping funnel was added 157 g (1 mole) of 2,4-diethyl-4-hydroxymethyl-2-oxazoline and 1 g of p-toluenesulfonic acid. To the flask was added dropwise 86 g (1 mole) of methacrylic acid. After the methacrylic acid was added, the dropping funnel was removed and replaced with a decanter head.

The mixture was heated and benzene was added to remove water of reaction. After 4 hours all the water had been removed.

The mixture was then distilled through an 8-inch Vigreaux column at 2 mm of mercury and the fraction collected between 77° C and 88° C as the product 2,4-diethyl-4-methacryloyloxymethyl-2-oxazoline. The compound was assayed by the gas chromatographic method and found to be 85.3% pure, and was a colorless liquid.

A mixture was prepared of 8.3 g of 2,4-diethyl-4-methacryloyloxymethyl-2-oxazoline and 50.0 g of water. The compound exhibited inverse solubility in water. The compound was insoluble at room temperature, 23° C, and slightly soluble cold.

A glass assembly is prepared as in Example 1 with the exception that a mixture of 2,4-diethyl-4-methacryloyloxymethyl-2-oxazoline and water is placed between the two panes of glass. A glass assembly is created that will transmit or reflect light.

EXAMPLE 4

The procedure described in Example 1 is repeated in all essential details with the exception that 2-amino-2-ethyl-1,3-propanediol and acetic acid are the initial reactants in a 1:1 molar ratio. These compounds are combined using the method of Purcell, U.S. Pat. No. 3,336,145 to form 2-methyl-4-ethyl-4-hydroxymethyl-2-oxazoline.

The 2-methyl-4-ethyl-4-hydroxymethyl-2-oxazoline is reacted with butyric acid in a 1:1 molar ratio following the method of Purcell to produce 2-methyl-4-ethyl-4-butyryloxymethyl-2-oxazoline.

The compound 2-methyl-4-ethyl-4-butyryloxymethyl-2-oxazoline exhibits inverse solubility when dissolved in water. An aqueous solution of the compound is placed between two panes of glass to form an assembly for transmitting or reflecting light.

EXAMPLE 5

The procedure described in Example 1 is repeated in all essential details with the exception that 2-amino-2-methyl-1,3-propanediol is reacted with butyric acid in a 1:1 molar ratio according to the method of Purcell to produce 2-propyl-4-methyl-4-hydroxymethyl-2-oxazoline.

The 2-propyl-4-methyl-4-hydroxymethyl-2-oxazoline is reacted with propionic acid in a 1:1 molar ratio following the method of Purcell to form 2-propyl-4-methyl-4-propionyloxymethyl-2-oxazoline.

The compound 2-propyl-4-methyl-4-propionyloxymethyl-2-oxazoline exhibits inverse solubility when dissolved in water. An aqueous solution of the compound is placed between two panes of glass to form an assembly for transmitting or reflecting light.

EXAMPLE 6

The procedure described in Example 1 is repeated in all essential details with the exception that tris(hydroxymethyl)aminomethane is reacted with propionic acid in a 1:2 molar ratio of tris(hydroxymethyl)aminoethane to propionic acid. The compound produced is the oxazoline ester 2-ethyl-4-hydroxymethyl-4-propionyloxymethyl-2-oxazoline.

The compound 2-ethyl-4-hydroxymethyl-4-propionyloxymethyl-2-oxazoline exhibits inverse solubility in water. An aqueous solution of the compound is placed between two panes of glass to form an assembly for transmitting or reflecting light.

EXAMPLE 7

The procedure of Example 1 is repeated in all essential details with the exception that the initial reactants are 2-amino-1,3-propanediol and propionic acid in a 1:1 molar ratio. The reactants are combined following the method of Purcell to form 2-ethyl-4-hydroxymethyl-2-oxazoline.

The 2-ethyl-4-hydroxymethyl-2-oxazoline is reacted with methacrylic acid in a 1:1 molar ratio according to the method of Purcell. The oxazoline ester produced is 2-ethyl-4-methacryloyloxymethyl-2-oxazoline.

The compound 2-ethyl-4-methacryloyloxymethyl-2-oxazoline exhibits inverse solubility in water. An aqueous solution of the compound is placed between two panes of glass to form an assembly for transmitting or reflecting light.

EXAMPLE 8

The procedure of Example 1 is repeated in all essential details, with the exception that the initial reactants are 2-amino-2-ethyl-1,3-propanediol and propionic acid reacted in a 1:1 molar ratio. The oxazoline produced is 2,4-diethyl-4-hydroxymethyl-2-oxazoline.

The 2,4-diethyl-4-hydroxymethyl-2-oxazoline is reacted with acetic acid in a 1:1 molar ratio according to the method of Purcell. The oxazoline ester produced is 2,4-diethyl-4-acetyloxymethyl-2-oxazoline.

The 2,4-diethyl-4-acetyloxymethyl-2-oxazoline exhibits inverse solubility in water. An aqueous solution of the compound is placed between two panes of glass to form an assembly for transmitting or reflecting light.

What is claimed is:

1. A temperature responsive combination for transmitting or reflecting light comprising a double-paned glass assembly and lying between said panes a temperature sensitive aqueous solution of from 10 to 50 percent by weight of a compound or mixture of compounds having the general formula

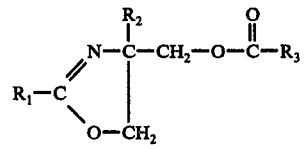

wherein
$R_1$ is a lower alkyl of from 1 to 3 carbon atoms, $R_2$ is selected from the group consisting of hydrogen, methyl, ethyl and hydroxymethyl, and $R_3$ is selected from the group consisting of methyl, ethyl, propyl and methylethenyl.

2. The temperature responsive combination of claim 1 wherein said compound is 2-ethyl-4-methyl-4-propionyloxymethyl-2-oxazoline.

3. The temperature responsive combination of claim 1 wherein said compound is 2,4-diethyl-4-propionyloxymethyl-2-oxazoline.

4. The temperature responsive combination of claim 1 wherein said compound is 2,4-diethyl-4-methacryloyloxymethyl-2-oxazoline.

5. The temperature responsive combination of claim 1 wherein said compound is 2-methyl-4-ethyl-4-butyryloxymethyl-2-oxazoline.

6. The temperature responsive combination of claim 1 wherein said compound is 2-propyl-4-methyl-4-propionyloxymethyl-2-oxazoline.

7. The temperature responsive combination of claim 1 wherein said compound is 2-ethyl-4-hydroxymethyl-4-propionyloxymethyl-2-oxazoline.

8. The temperature responsive combination of claim 1 wherein said compound is 2-ethyl-4-methacryloyloxymethyl-2-oxazoline.

9. The temperature responsive combination of claim 1 wherein said compound is 2,4-diethyl-4-acetyloxymethyl-2-oxazoline.

10. A temperature responsive double-paned glass assembly for transmitting or reflecting light comprising glass panes of from ⅛ inch to ¼ inch thick and spaced from ¼ inch to ½ inch apart and lying between said panes a temperature sensitive aqueous solution of from 30% to 40% by weight of the compound 2-ethyl-4-methyl-4-propionyloxymethyl-2-oxazoline.

* * * * *

UNITED STATES PATENT AND TRADEMARK OFFICE
CERTIFICATE OF CORRECTION

PATENT NO. : 4,082,892
DATED : April 4, 1978
INVENTOR(S) : John Adams Frump

It is certified that error appears in the above-identified patent and that said Letters Patent are hereby corrected as shown below:

Column 3, line 38, "1/2", first occurence, should read -- 1/4 --

*Signed and Sealed this*

*Twenty-second* Day of *August 1978*

[SEAL]

*Attest:*

RUTH C. MASON
*Attesting Officer*

DONALD W. BANNER
*Commissioner of Patents and Trademarks*